(12) United States Patent  
Hazenfield

(10) Patent No.: US 8,259,912 B2
(45) Date of Patent: Sep. 4, 2012

(54) ON-HOLD MESSAGE SYSTEM

(75) Inventor: Joey C. Hazenfield, Cincinnati, OH (US)

(73) Assignee: Info-Hold, Inc., Cincinnati, OH (US)

(*) Notice: Subject to any disclaimer, the term of this patent is extended or adjusted under 35 U.S.C. 154(b) by 1274 days.

(21) Appl. No.: 11/783,188

(22) Filed: Apr. 6, 2007

(65) Prior Publication Data

US 2007/0230669 A1  Oct. 4, 2007

Related U.S. Application Data

(63) Continuation of application No. 10/345,413, filed on Jan. 16, 2003, now abandoned.

(60) Provisional application No. 60/349,236, filed on Jan. 18, 2002.

(51) Int. Cl.
*H04M 1/64* (2006.01)

(52) U.S. Cl. ... 379/88.23; 370/352; 379/87; 379/201.01; 379/233; 379/393; 709/201; 709/226; 709/229

(58) Field of Classification Search ............ 379/114.13, 379/142.06, 142.15, 201.12, 67.1–88.28, 379/156–167.04, 177–187, 201.01, 207.01, 379/208.01–215.01, 225–234, 265.01–266.1, 379/393; 348/14.01–14.16; 370/259–271, 370/351–356; 704/270–278; 709/201–207, 709/217–248

See application file for complete search history.

(56) References Cited

U.S. PATENT DOCUMENTS

| 5,311,423 | A |   | 5/1994  | Clark |              |
|-----------|---|---|---------|-------|--------------|
| 5,600,710 | A | * | 2/1997  | Weisser et al. | 379/88.19 |
| 5,870,461 | A |   | 2/1999  | Hazenfield |         |
| 5,920,616 | A |   | 7/1999  | Hazenfield |         |
| 5,946,378 | A | * | 8/1999  | Farfan | 379/88.23 |
| 5,986,979 | A |   | 11/1999 | Bickford et al. |    |
| 5,991,374 | A | * | 11/1999 | Hazenfield | 379/101.01 |
| 6,014,439 | A | * | 1/2000  | Walker et al. | 379/266.01 |
| 6,020,916 | A | * | 2/2000  | Gerszberg et al. | 348/14.07 |
| 6,067,349 | A |   | 5/2000  | Suder et al. |      |
| 6,128,255 | A | * | 10/2000 | Yankowski | 369/30.06 |
| 6,170,060 | B1 | * | 1/2001  | Mott et al. | 726/29 |
| 6,252,944 | B1 |   | 6/2001  | Hansen, II et al. |  |
| 6,272,211 | B1 |   | 8/2001  | Hazenfield |        |

(Continued)

OTHER PUBLICATIONS www.esi-estech.com; May 5, 2003 ESI (Estech Systems, Inc.) web site; 1 pp.

(Continued)

*Primary Examiner* — Hemant Patel
(74) *Attorney, Agent, or Firm* — Wood, Herron & Evans, LLP

(57) ABSTRACT

A programmable in-the-skin or intelligently connected message on hold delivery system is disclosed which comprises a message storage system and a processor for generating prompts which are transmitted to a control device. The prompts are received at the control device and allow an operator to select from a number of options in order to select, among other things, certain ones of the messages stored on said message storage system for playback, as well as the sequence in which said messages are to be played back. The message playback devices are each provided with one or more libraries of messages, and comprise at least one or more audio and/or visual advertising messages. Said system enables the user to start a pre-recorded audio or visual message at the beginning each time a caller is placed on hold in the telephone system.

37 Claims, 8 Drawing Sheets

U.S. PATENT DOCUMENTS

| | | | |
|---|---|---|---|
| 6,442,244 B1* | 8/2002 | Fellingham et al. | 379/76 |
| 6,459,776 B1* | 10/2002 | Aktas et al. | 379/88.13 |
| 6,587,555 B1* | 7/2003 | Cripe et al. | 379/211.02 |
| 6,683,941 B2* | 1/2004 | Brown et al. | 379/88.22 |
| 6,687,352 B2* | 2/2004 | Hazenfield | 379/162 |
| 6,751,306 B2* | 6/2004 | Himmel et al. | 379/201.02 |
| 6,766,006 B1* | 7/2004 | Hu et al. | 379/201.12 |
| 6,785,538 B2* | 8/2004 | Nihei | 455/414.1 |
| 6,795,536 B1* | 9/2004 | Ronca | 379/88.25 |
| 6,940,962 B1 | 9/2005 | Hansen, II et al. | |
| 6,952,416 B1* | 10/2005 | Christie, IV | 370/354 |
| 7,076,035 B2* | 7/2006 | Loudermilk | 379/101.01 |
| 7,142,560 B2* | 11/2006 | Mansfield | 370/466 |
| 7,173,911 B1* | 2/2007 | Sarkar et al. | 370/252 |
| 7,209,475 B1* | 4/2007 | Shaffer et al. | 370/355 |
| 2001/0030660 A1* | 10/2001 | Zainoulline | 345/720 |
| 2002/0076032 A1* | 6/2002 | Rodriguez et al. | 379/266.01 |
| 2002/0077130 A1* | 6/2002 | Owensby | 455/466 |
| 2003/0007606 A1 | 1/2003 | Suder et al. | |
| 2008/0095345 A1* | 4/2008 | Sharma et al. | 379/201.01 |
| 2009/0180601 A1* | 7/2009 | Roberts et al. | 379/211.01 |

OTHER PUBLICATIONS www.esi-estech.com/what_to_look_for_1.htm; May 5, 2003; 9 pp.

IP E-Class (ESI); "All-In-One IP PBX System" sales brochure; May 5, 2003; 6 pp.

IVX E-Class; "All-In-One Digital Phone System"; May 5, 2003, 6 pp.

* cited by examiner

ON-HOLD MESSAGE SYSTEM

The present application is a continuation of U.S. patent application Ser. No. 10/345,413, filed on Jan. 16, 2003, now abandoned which in turn claims priority under 35 U.S.C. §119(e) to U.S. Provisional Patent Application Ser. No. 60/349,236, filed on Jan. 18, 2002, the entire contents of both of said applications being expressly incorporated herein by reference.

The invention is related to on-hold message systems for business telephone systems. More specifically, the invention relates to an intelligent integrated message on-hold system that allows a user, connected through an intelligent interface, to store and randomly access selected pre-recorded messages with a variety of options for playback of the messages when callers are placed on hold. Additional features include, but are not limited to, the ability to start the stored message at the beginning of the message each time a call is placed on hold if desired.

Many businesses use music or audio promotions of products or services while the customer is placed on-hold and waiting for assistance. Most existing telephone systems use externally connected tape players, digital announcers or CD players as the audio source. These external audio sources are connected through a port on the telephone system and are referred to as "dumb connections." They are called dumb connections because there is no ability to interact, or program the external audio source.

A prior art message on-hold (MOH) telephone system is disclosed in U.S. Pat. No. 5,870,461 to Hazenfield (the '461 patent), the entire contents of which are expressly incorporated herein by reference. The MOH system disclosed in the '461 patent provides the ability to add or delete individual audio messages from a playlist and to change the play sequence of messages stored within the business telephone system. Another prior art MOH telephone system is disclosed in U.S. Pat. No. 5,991,374 to Hazenfield (the '374 patent) the entire contents of which are expressly incorporated herein by reference. The '374 patent discloses a programmable on-hold message system for controlling the playback of messages in music on-hold compatible telephone systems by providing the user with a geographic user interface for control of messages and track selection. The system is intelligent but interfaces to the telephone system through a dumb connection.

What does not currently exist is an MOH system which can be accessed from any general purpose computer, dual-tone multi frequency (DTMF) telephone or digital electronic terminal. Such a system could provide play-lists of messages from a library of messages contained on a local storage unit, located within the telephone system, i.e., as an integrated feature of the business telephone system. By incorporating an intelligent interface to the business telephone system, an operator could modify the playlists by adding messages, deleting messages, or changing the order of messages in each playlist. Furthermore, in such a system, it would be advantageous to be able to assign different telephone extensions within a business phone system to particular playlists when callers calling those extensions are placed on hold. In this manner, callers calling an engineering department of a company, for instance, could hear messages related to engineering. Callers calling extensions in a sales department could hear messages related to recent product offerings. It would further be advantageous to extend the features of such a system to allow two (or more) companies to share a phone system but provide separate messages to be played to the callers placed on hold for each company sharing such a system. Furthermore, the messages related to the two (or more) different companies could be assigned to different playlists, with callers calling a first company listening to messages related to the first company, callers calling a second company listening to messages related to the second company, and so on. Furthermore, it would be advantageous to provide the ability to start the messages at the beginning of the tracks, instead of at random points within the tracks, as is found in the prior art.

The above objectives are met and other advantages are realized in a method and system according to the present invention, in which messages are stored in and retrieved from one or more message libraries, each library containing one or more messages. The message playback system is capable of generating audible and/or visual prompts to assist an operator to select various options in order to change message playback parameters. Among the parameters which can be changed are a playlist for determining a sequence in which messages are played, and an extension list or trunk (telephone line) list for determining which message libraries are associated with various extensions or telephone lines.

In accordance with an aspect of the present invention, a programmable message delivery system is provided which allows operators to specify message sequences that are to be played at one or more sites via a telephone system. The message delivery system allows for storing a plurality of messages and for controlling at least one or more of the stored messages. The message delivery system allows the operator to make several choices. These choices include selecting which message(s) in a message library is (are) to be played; the sequence in which the messages are to be played; which telephone extensions are to be associated with a particular message library; and a system and method for implementing these choices.

In accordance with yet another aspect of the invention, the interface between the user and the message delivery system is a digital proprietary terminal, a telephone instrument, or a general purpose computer connected via a network (which can be the Internet, an intranet, LAN, WAN, or public or private phone line (wireless or wired)) to a business telephone system. If, for example, the user interface is a general purpose computer accessing the message delivery system via the Internet, prompts generated by the message delivery system, comprise web pages viewable on the general purpose computer having a web browser. An operator accesses the web pages via the computer and makes selections via an input device such as a mouse or keyboard. The choices are communicated back to the message delivery system.

In accordance with a further aspect of the invention, the communication link is a telephone network, and the remote communication device is a standard DTMF telephone. A remote operator accesses the message delivery system by calling the telephone number assigned to the message delivery system. The processor of the message delivery system then generates audio prompts which are transmitted to the operator over the telephone network. The operator is able to make selections by pressing appropriate keys on the DTMF telephone. The operator's selections are transmitted back over the telephone network and received by the message delivery system. The operator's selections are then implemented by the message delivery system.

In accordance with still another aspect of the present invention, the processor of the message delivery system is programmable to generate prompts which allow a user to select a message from the message directory and to display a full text script of the message, or listen to at least a portion of the message.

In accordance with yet another aspect of the present invention, the processor of the message delivery system is programmable to receive control signals from a communication device and to implement selections represented by the control signals, such selections affecting parameters of the message delivery system, such as whether any messages should be deleted, the sequence in which messages are to be played, and which message libraries are associated with certain telephone extensions or telephone lines connected to the business telephone system.

In accordance with still another aspect of the present invention, the telephone system is able to start a pre-recorded message at the beginning of the message when a caller is placed on hold. Additionally, a further aspect of the invention allows the user of the message delivery system to store one or more messages and recall these messages using a set of commands from within the telephone system and store the messages, preferably, within the body of the phone system, or externally with an intelligent connection to the message delivery system. Furthermore, video and/or multimedia messages maybe displayed to callers with appropriate phone or communication systems, when they are placed on hold.

The novel features and advantages of the present invention will be more readily apprehended from the detailed description of the preferred embodiments which follows, when read in connection with the appended drawings, which form a part of this original disclosure, and wherein.

Figure 1A:
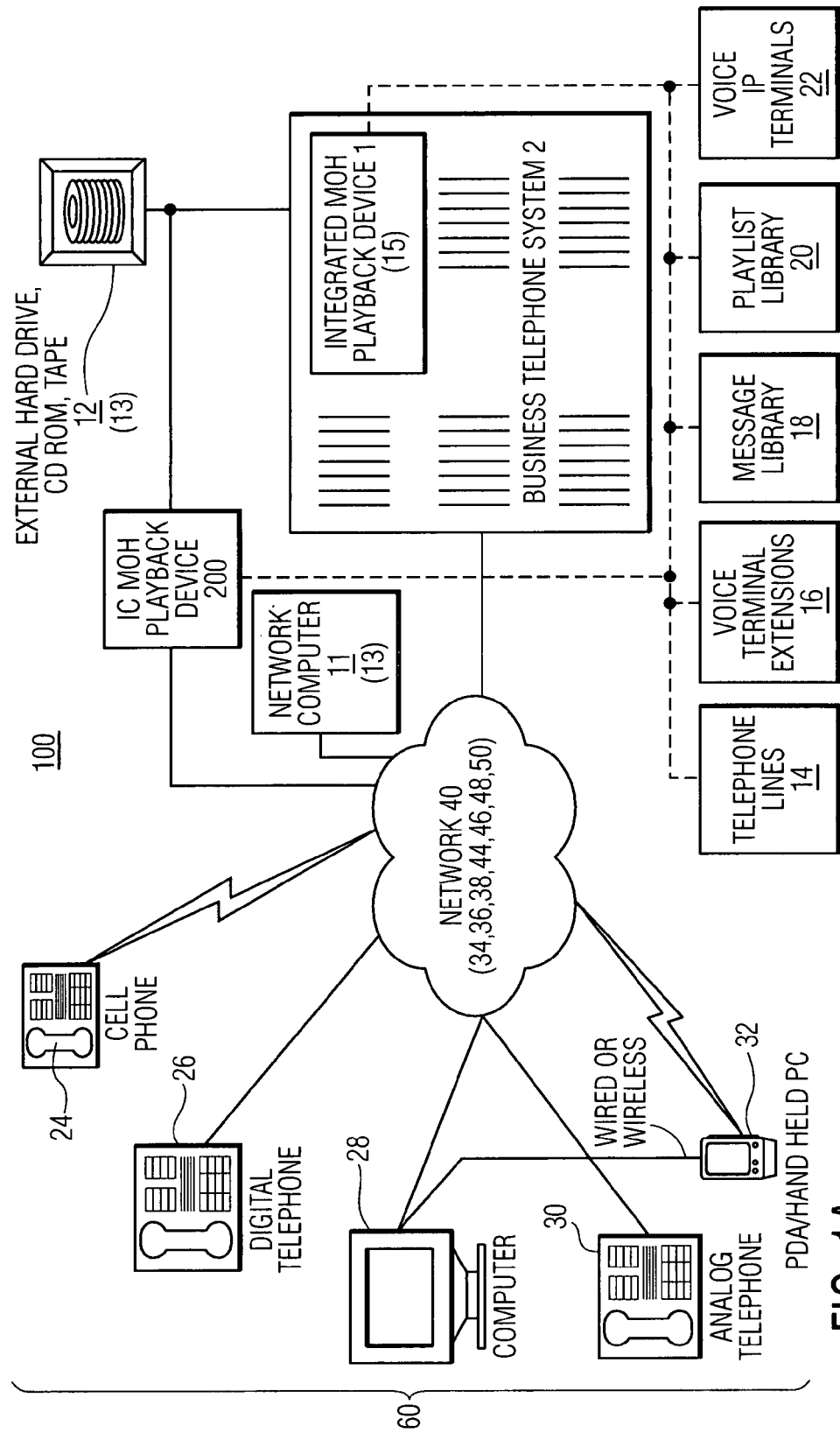
FIGS. 1A and 1B are schematic block diagrams of alternative embodiments of a programmable integrated message on-hold delivery system constructed in accordance with an embodiment of the present invention.

The various features of the preferred embodiments will now be described with reference to the drawing figures, in which like parts are identified with the same reference characters. The following description of the presently contemplated best mode of practicing the invention is not to be taken in a limiting sense, but is provided merely for the purpose of describing the general principles of the invention.

Figure 1B:
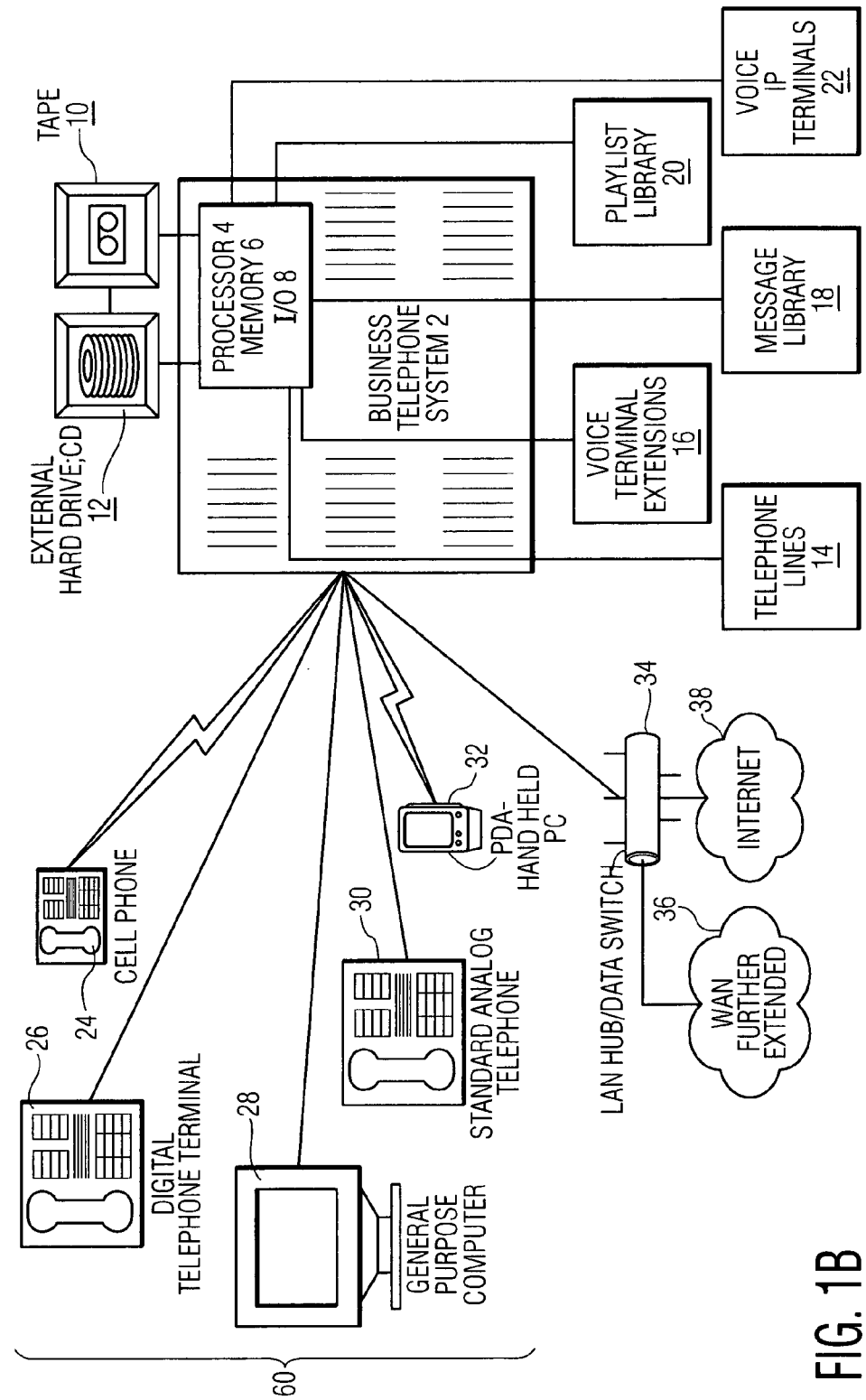

FIGS. 1A and 1B are schematic block diagrams of alternative embodiments of a programmable integrated message on-hold delivery system constructed in accordance with an embodiment of the present invention. FIG. 1A depicts both an intelligently connected message on-hold playback device (IC MOH playback device) 200 and an integrated message on-hold playback device (IMOH playback device) 1 as part of a message on-hold delivery system 100. Either IC MOH playback device 200 or IMOH playback device 1, in conjunction with business telephone system 23 and the other elements shown and described below comprises a message on-hold delivery system 100. "Intelligently connected" means that the playback devices (i.e., message memory or storage devices) have an integrated microprocessor and input/output communication hardware, which further means that they can receive instructions, store instructions and act upon those instructions at the present or some later time. IMOH playback device 1 has the same features as IC MOH playback device 200, but is instead built within business telephone system 2, perhaps as a computer card, or other similar type of hardware design that achieves integration within the physical framework of business telephone system 2. Either IMOH playback device 1 or IC MOH playback device 200 communicates with business telephone system 2, for the playback of messages to callers within the business telephone system while placed on-hold. The term "message" used herein refers to music, advertisements or other recorded audio or multi-media messages, which can be played for a person whose telephone or video call has been answered by a human or auto-attendant device of the business telephone system.

The message on-hold delivery system 100 of FIG. 1A comprises either IMOH playback device 1 or IC MOH playback device 200, business telephone system 2 (which is a conventional message on-hold (MOH) telephone system), external message storage devices 13 (tape, CD ROM, external hard drive 12), network computer 11 (with various memory devices), network 40, interfaces between components and remote devices 60. Network 40 and remote devices 60 each comprise many different types of devices, which will be discussed in detail below. External message storage devices comprise a tape player, CD ROM and/or external hard drive 12 and the memory located within or attached to network computer 11.

As shown in FIG. 1B, internal message on-hold (IMOH) playback device 1 comprises a processor 4, memory 6 and input/output hardware 8. In both IMOH playback device 1 and IC MOH playback device 200, program instructions are stored within their respective memory devices which enable the processors within to perform the process of a message on-hold system. It is well known in the art that such instructions may be stored in suitable and appropriate memory.

Remote devices 60 of message on-hold delivery system 100 comprise a cell phone 24, a digital telephone 26, a general purpose computer (computer) 28, an analog telephone 30 and/or a personal digital assistant (PDA) 32. Network 40 comprises a LAN 34, a WAN 36, the Internet 38, a private phone network 44, a cellular phone network 46, a satellite phone network 48 and/or a public switched telephone network (PSTN) 50. These can be used singularly or in various combinations with each other. For example, cell phone 24 will most certainly interface with cellular network 46, which may then interface with PSTN 50. Or, PDA 32 can interface directly with cellular network 46, or through computer 28, which then might interface with PSTN 50 to connect to business telephone system 2. Because computer 28 (as well as cell phone 24 and PDA 32) can be used with the Internet, a web browser might be available as an interface to messaging on-hold delivery system 100. Additionally, there might be a private phone network 44 which is a final network within the "walls" of the business such that all other networks interface directly to it. A discussion of all possible means of interfacing remote devices 60 with business phone system 2 is beyond the level necessary for an understanding of the present invention. It is generally known, and understood by those skilled in the art, that any of those remote devices listed, or which in the future become available to the public or private sector to use, can be used in accordance with the system and methods of the invention, and an intimate understanding of how these communications work is not needed to understand how the present invention works.

Figure 2:
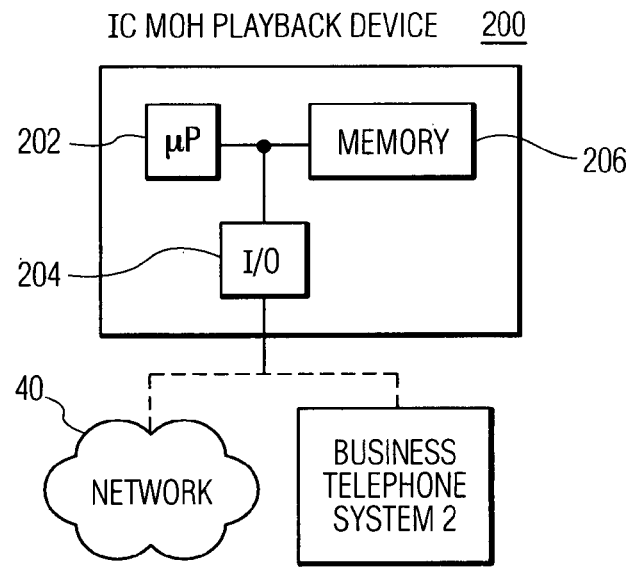
FIG. 2 is a schematic block diagram of a intelligently connected message on-hold playback device constructed in accordance with an embodiment of the present invention and connected to a conventional message on-hold compatible telephone system.

FIG. 2 is a schematic block diagram of an intelligently connected message on-hold playback device constructed in accordance with an embodiment of the present invention and connected to a conventional message on-hold compatible telephone system 2. Intelligently connected message on-hold (IC MOH) playback device 200 comprises a processor 202, memory 206 and input/output (I/O 204). Note that in FIG. 1A, IC MOH playback device 200 is shown with a connection to both network 40 and directly to business telephone system 2. In the former case, communications to and from IC MOH playback device 200 are through network 40, which might include a LAN 34 (FIG. 1B) and/or a private phone network 44. In this case, the network computer 11 will facilitate communications. In the latter case, IC MOH playback device 200 will communicate directly with business telephone system 2. Memory 206 will hereinafter be referred to as an external message storage device 13. External message storage devices 13 include not only external hard drive/CD ROM and tape, but also the memory component of network computer 11. Essentially, any message storing memory device that is not physically located within business telephone system 2 is considered to be an external message storing device 13. Any message storing memory device 15 physically located with business telephone system 2 is considered to be an internal message storage device. Any and all of the memory devices are capable of storing messages for use in the messaging on-hold delivery system 100, and can be accessed by the business telephone system 2 when the playback of messages for on-hold callers is necessary.

Referring back to FIG. 1A, remote devices 60 are capable of controlling the playback and programming of messages. Although an apparently exhaustive list of remote devices and network systems has been presented, it should be realized by those skilled in the art that other combinations of network types and remote devices 60 are contemplated to be within the scope of the present invention. Messages can be stored in any of the external message storage devices 13 and/or internal message storage devices 15. Internal message storage devices 15 might also comprise an integrated circuit chip, such as a random access memory storage device or even a read-only memory (ROM) storage device. Message on-hold delivery system 100, which also comprises executable software instructions located within memory 206 of IC MOH playback device 200 and memory 6 of JMOH playback device 1 (as well as the associated aforementioned hardware) can access any of the internal message storage devices 15 and external message storage devices 13, to obtain specific, individual pre-recorded messages as necessary. Through the use of network 40 and remote devices 60, members of the business (or multiple businesses for a shared message on-hold delivery system 100) that own message on-hold delivery system 100 can record or download new messages.

In accordance with the present invention, both playback devices 1, 200 utilize internal and external message storage devices 13, 15 to store header information pertaining to each message stored in the storage device, such as a message number, an alphanumeric message title, etc. Header information can be accessed by the processors 4, 202 to generate prompts which are transmitted to one or more of the remote devices 60 to inform the operator which messages are available in external and internal message storage devices 13, 15. Header information may also be used by processor 4, 202 to define playlists, and the number and content of playlists may also be conveyed to operators using one or more of remotes devices 60. Furthermore, processors 4, 202 can transmit at least a portion of each message to any of remote communication devices 60 to further assist an operator of the system in identifying messages and configuring the playlist (i.e., for use in previewing the stored messages).

Thus, in accordance with the present invention, both playback devices 1, 200 can be programmed by operators using any of remote devices 60 to select and play messages stored in memory within (or accessible to) each playback device 1, 200 in the business telephone system 2. Furthermore, message on-hold delivery system 100 simplifies the process of selecting message playlists and allows an operator to more effectively maintain a promotional program for customers placed on-hold.

Processors 4, 202 of message on-hold delivery system 100, are each programmed to generate prompts based on existing data structures. This allows operators to define and update message playlists and any other necessary parameters related to the configuration of the messages via remote communication devices 60. The data structures stored in both playback devices 1, 200 comprise identification codes corresponding to each message stored in either playback device 1, 200 (or memory accessible to each); playlists currently in use; telephone extensions connected to business telephone system 2 that are associated with each playlist, and alternate playlists (e.g., playlists having future effective dates), among other data. Additionally, processors 4, 202 are also programmed to provide an interface by generating prompts which are transmitted to all or any of remote devices 60 for guiding an operator when making changes to the configuration of messaging on-hold delivery system 100 (e.g., defining a new playlist or modifying existing records).

If remote communication device 60 is computer 28 with a standard web browser, then both playback devices 1, 200 will be configured to generate prompts as HTML web pages to be displayed in the browser window of computer 28. Playback devices 1, 200 will also be programmed to respond to input from computer 28, such as data entered via a keyboard, keypad, or clicks of a mouse. Alternatively, if the remote device 60 is either digital telephone 26 or analog telephone 30, external and internal message storage devices 13, 15 will be configured to generate prompts in the form of audio messages which are heard by the operator of the telephones 26, 30 (audio prompts may also be configured to be sent to computer 28, and possibly PDA 32, if operating through the Internet). The prompts will provide guidance to the operator, including instructions on pressing certain telephone keys to cause certain actions. Playback devices 1, 200 will be further adapted to receive response signals from the telephones 26, 30 based on keys which are pressed by their operator(s).

Figure 3:
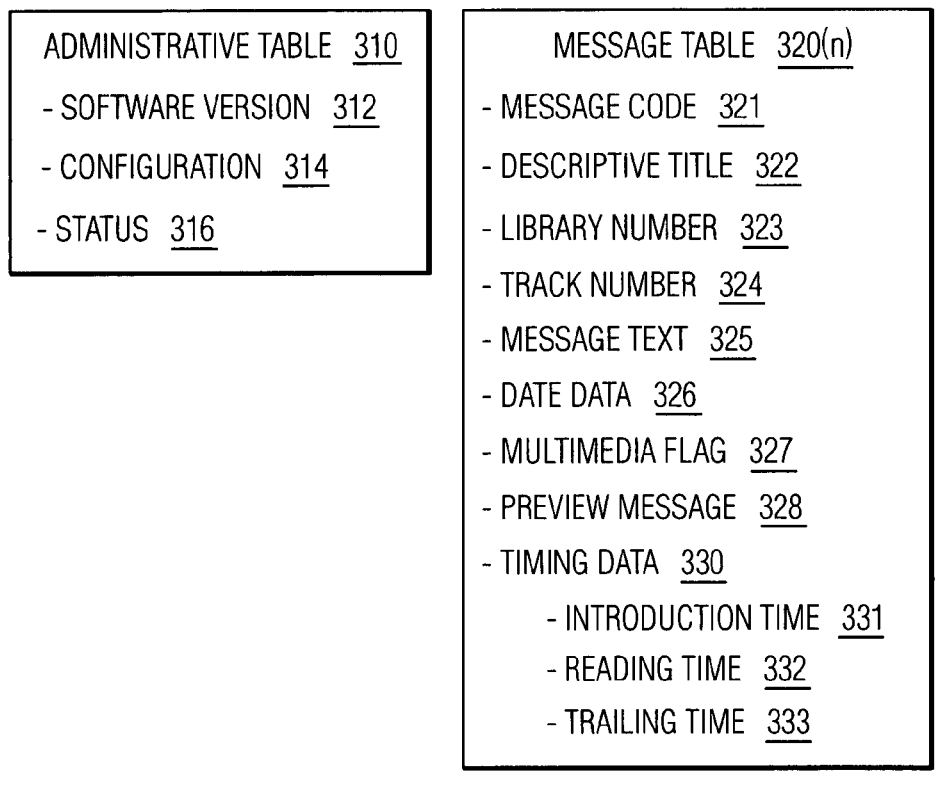
FIG. 3 illustrates a block diagram representation of an administrative and message database table used in conjunction with an embodiment of the invention.

FIG. 3 illustrates a block diagram representation of administrative and message database tables used in conjunction with an embodiment of the invention. Playback devices 1, 200 of messaging on-hold delivery system 100, store various data structures in database tables. Administrative table 310 includes data such as software version data 312 (i.e., the version of software running on playback device 1, 200), configuration data 314 (i.e., the date and time when the configuration of playback device 1, 200 was last programmed) and status data 316 (i.e., when the status of playback device 1, 200 was last read).

In addition to administrative table 310, playback devices 1, 200 store message tables 320. Each message in message on-hold delivery system 100 is preferably defined in a separate message table 320. Thus, in FIG. 3, the message table is denoted as "320(n)" the "n" indicating a number of the message table, which can be unlimited, but in a practical sense will be limited by memory storage costs, etc. Message table 320 defines a single message currently in existence in each playback device 1, 200 of message on-hold delivery system 100. Changes to message table 320(n) may occur when individual messages are added to, deleted from, or modified within, playback device 1, 200.

Message table 320(n) comprises a plurality of fields, some of which are interactive, for storing and/or retrieving information about the particular message. This information includes: message code 321 (which uniquely identifies that message); descriptive title 322 for the message (i.e., header information, discussed above); library number 323; track number 324 (i.e., the actual track number on internal or external message memory storage devices 13, 15 that contains the audio and/or video data); message text 325 (for storing the text of the message for generation, if desired, on the screen of computer 28); date data 326 (the date on which the message was recorded); multimedia flag 327 (which is an identification of either an audio or multimedia file version of the message, which can be transmitted to an appropriate remote device 60 for playback); message preview 328 (which will preview the message with an appropriately connected remote device 60); and timing data 330, which further comprises introduction time 331, reading time 332 and trailer time 333 (all timing data is in seconds). The unique message codes in the message tables preferably consist of a single number.

Figure 4:
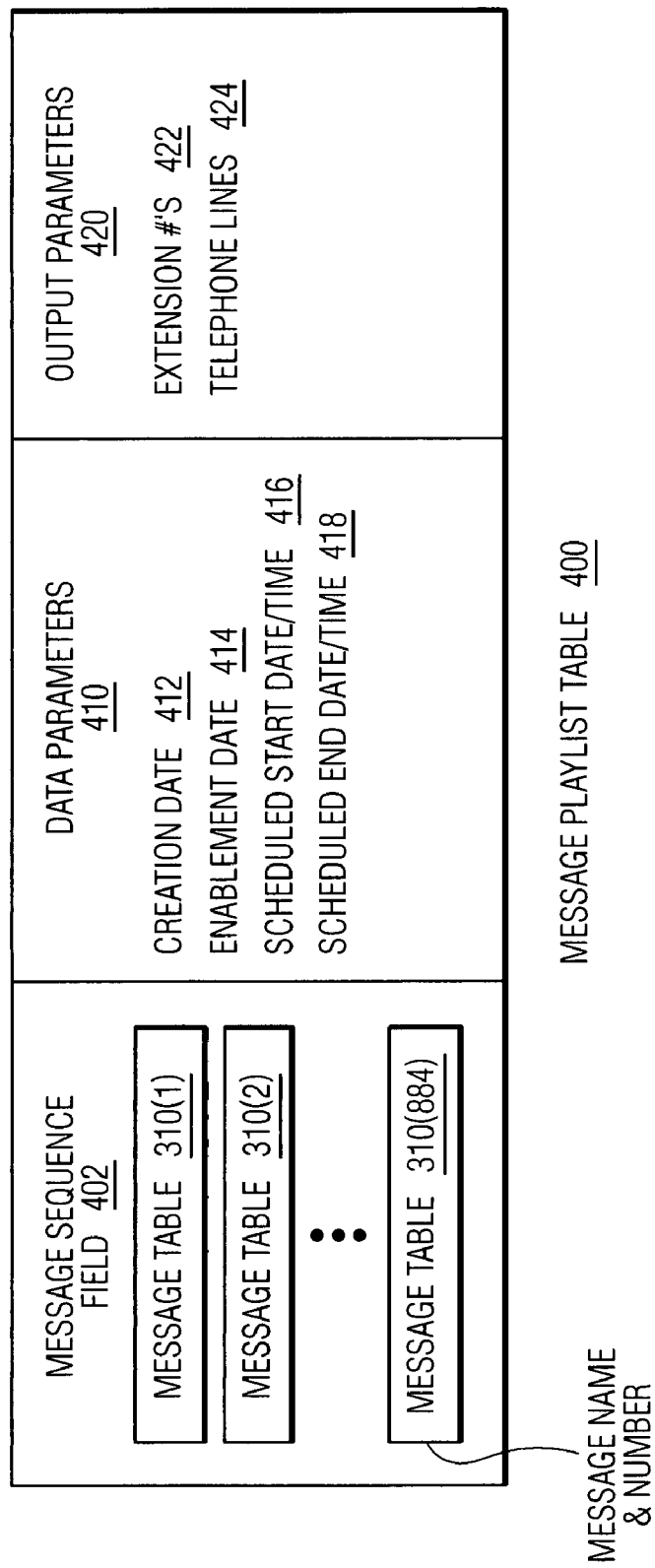
FIG. 4 illustrates a block diagram representation of a message playlist database table used in conjunction with an embodiment of the invention.

FIG. 4 illustrates a block diagram representation of a message playlist database table used in conjunction with an embodiment of the invention. Message playlist table 400 is stored in memory within (or accessible to) playback devices 1, 200. Message playlist table 400 is comprises three major sections: the first is message sequence field 402, the second is message data parameters 410 and the third is output parameters 420. Message sequence field 402 contains a list of the messages that comprise the playlist. The "playlist" is, as its name denotes, a list of the messages that the message on-hold system will play when a caller is placed on hold; however, within the structure of playback device 1, 200, the playlist is referred to as message playlist table 400(n). The "n" denotes that there may be a plurality of playlists created by any operator of messaging on-hold system 100). The messages in the message sequence field 402 are listed according to their message table number (i.e., message table 310(1), message table 310(5), etc.). The order within message sequence field 402 is the order in which the messages will be played. Thus, in FIG. 4, the message defined by message table 310(1) will be played first, followed by the message defined in message table 310 (5), etc.

The second section of message playlist 400 is data parameters 410. Data parameters 410 include creation date 412, enablement date 414, scheduled start date/time 416 and scheduled end date/time 418. The third section of message playlist table 400 is output parameters 420. In output parameters 420, extension numbers 422 and/or telephone lines 424 are listed which will play the message sequence defined in message sequence field 402.

Various graphic and textual displays can be displayed on a messaging on-hold (MOH) website for remote devices 60 that are capable of accessing the MOH website and of displaying these displays. Some remote devices are capable of receiving textual displays only, and those remote devices 60 will be discussed below. The principal aforementioned remote device 60 capable of displaying the graphic displays is computer 28, and possibly PDA 32. The graphic and textual displays correspond to prompts generated by the message on-hold delivery system 100, and transmitted to computer 28. The graphic and textual displays are created in a conventional manner using, for example, relational database software, such that data entered into the fields on the screens are processed and stored to tables and are otherwise used to generate message playlists in the message on-hold delivery system 100.

Figure 5:
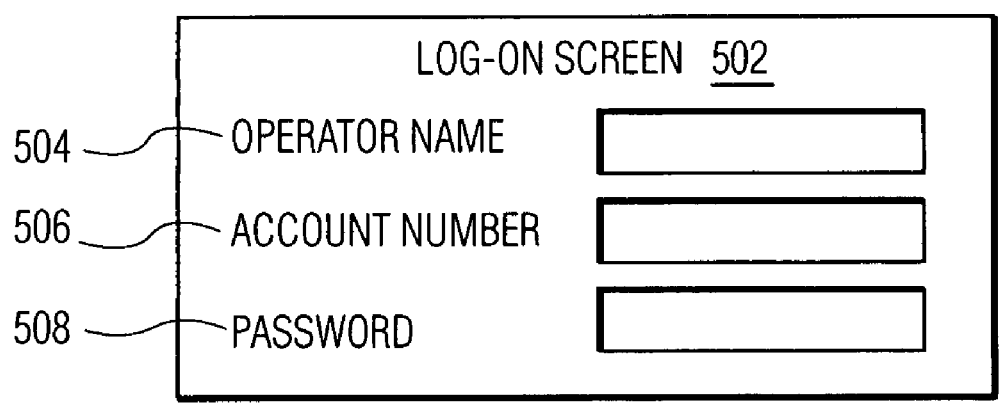
FIG. 5 is a representation of a graphic interface for use in a message on-hold system according to an embodiment of the invention.

FIG. 5 is a representation of a graphic interface for use in a message on-hold system according to an embodiment of the invention. The processors in each of playback devices 1, 200 is are programmed to generate a number of prompts to guide an operator through the process of generating message playlists, as well as modifying existing playlists. The prompts generated by the processors of playback devices 1, 200 allow an operator to describe relationships between extension numbers 422 and telephone lines 424 connected to business phone system 2, and message tables 310(n) and message playlist tables 400(n) in both graphical (i.e., MOH website use) or audible terms, which are then recorded in the memory of playback devices 1, 200. If a MOH website is used, a number of graphic interfaces representing the display of prompts on a are depicted on a remote computer in FIG. 1. Of course, where visual prompts are described in relation to a computer having a web browser, similar menu prompts could easily be generated and responded to, in the form of DTMF tones. As shown in FIG. 5, the processors of both playback devices 1, 200 are programmed to generate a log-on screen 502 which prompts the operator to enter the operator's name 504, an account number 506 and a password 508. Once a valid password 508 is entered and recognized as such, the processors of each playback device 1, 200 are programmed to generate a main window screen which is transmitted to the computer 28.

Figure 6:
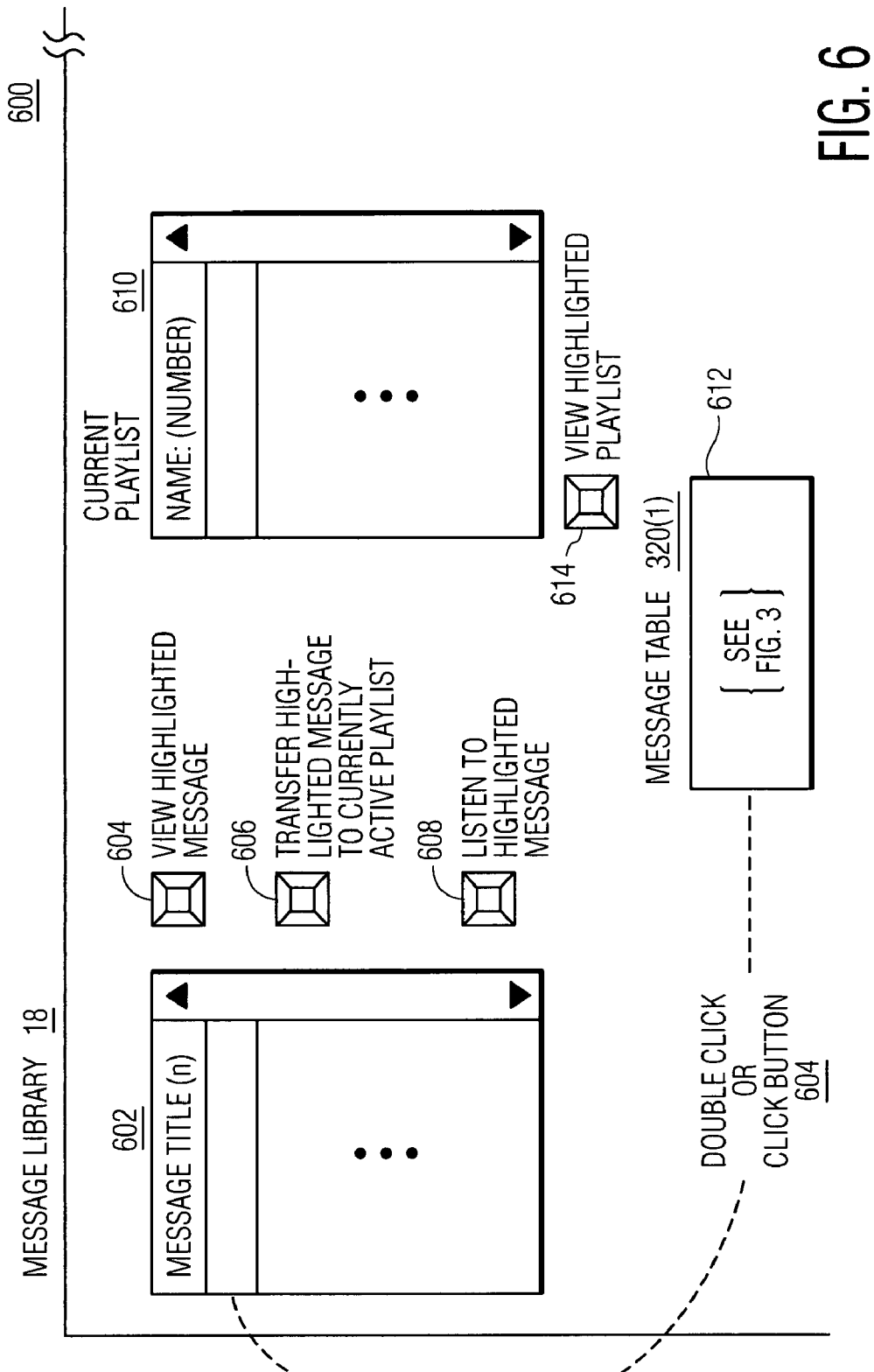
FIG. 6 illustrates a block diagram representation of a graphic interface for use in the message on-hold delivery system for selecting messages for a playlist via a message on-hold website.

FIG. 6 illustrates a block diagram representation of a graphic interface for use in the message on-hold delivery system for selecting messages for a playlist via a message on-hold website. Referring back to FIG. 1, there was shown five graphic interfaces that operators having access to a MOH website might use: telephone lines 14, voice terminal extensions 16, message library 18, playlist library 20 and voice Internet Protocol (IP) terminals 22. Message library 18, shown in detail in FIG. 6, shows a list, in window 602, of all of the messages available to the operator by message title and number. Double-clicking on any message in the list or clicking on the button 604 opens its corresponding message table 320(n) viewer screen. Message table 320(n) viewer screen allows the operator to view message parameters, and along with the buttons in message library 18, to play a portion of the message through the remote device 60, and to accept and transfer the highlighted message for playback from playback devices 1, 200 located at messaging on-hold delivery system 100. Window 602 shows all the messages available for selection. There are up/down arrow buttons for scrolling through the available messages. Clicking on button 604 will view (i.e., "open") the highlighted message table 320(n), so that the operator might see all the relevant data associated with the message. Button 606, when clicked, will transfer the highlighted message to the currently active playlist. A playlist can be chosen to be currently active in two ways: first, by using window 610 to chose a playlist to become active (by double clicking, and confirming the selection), or, secondly, by using playlist library 20, which will be discussed in detail below.

When message library 18 first opens, window 610 lists playlists associated with playback device 1, 200, and highlights the currently active playlist. Clicking button 614 then opens message playlist table 400(*n*), which is also known as playlist editor 730, shown in detail in FIG. 7. Clicking on button 608 allows an operator of an appropriate remote device 60 to listen to the message before selection, if desired. FIG. 6 shows the effect of either clicking on button 604 or double clicking on a highlighted message title in window 602 (corresponding to message table 320(1)), which then opens message table 320 (1) as window 612.

Figure 7:
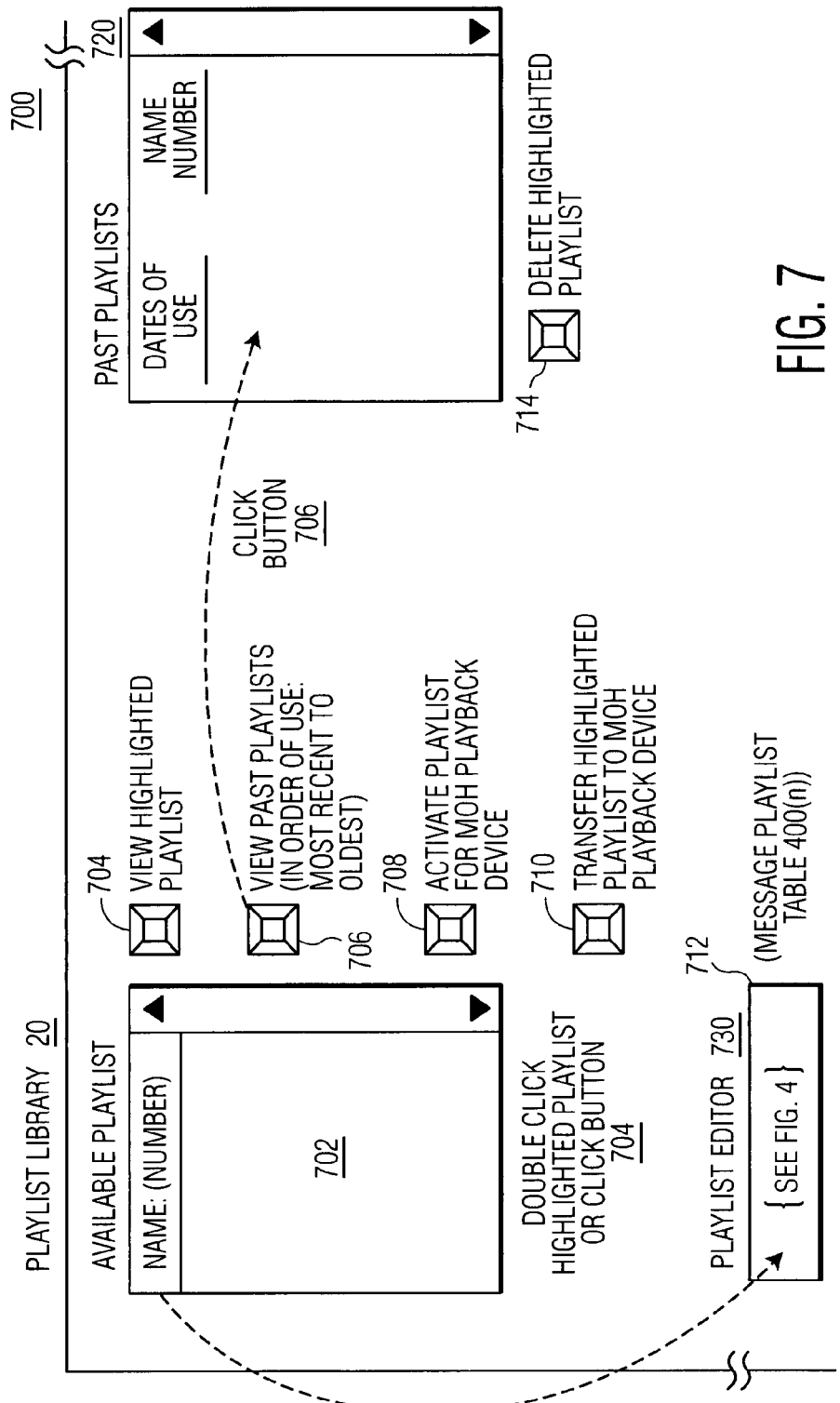
FIG. 7 illustrates a block diagram representation of a graphic interface for use in the message on-hold delivery system for programming a playlist via a message on-hold website.

FIG. 7 illustrates a block diagram representation of a graphic interface for use in the message on-hold delivery system for programming a playlist via a message on-hold website. Playlist library 20 is shown in FIG. 7. All available playlists are shown in window 702; double clicking on any one of them, or clicking the "view highlighted playlist" button 704 will open its corresponding message playlist table 400 (*n*), where "n" is the number of the playlist. Playlists in window 702 are listed by playlist name and number (n). Clicking button 706 opens window 720, and shows all the playlists ever used (unless the history file is purposely expunged) with playback devices 1, 200. Clicking on button 708 displays the active playlist for playback device 1, 200 in window 712 (when playlist library 20 first opens, the active playlist is already highlighted). Clicking on button 710 transfers (after seeking confirmation) the highlighted playlist to playback devices 1, 200 as the active playlist. Clicking on button 714 deletes the highlighted playlist from playback devices 1, 200.

Figure 8:
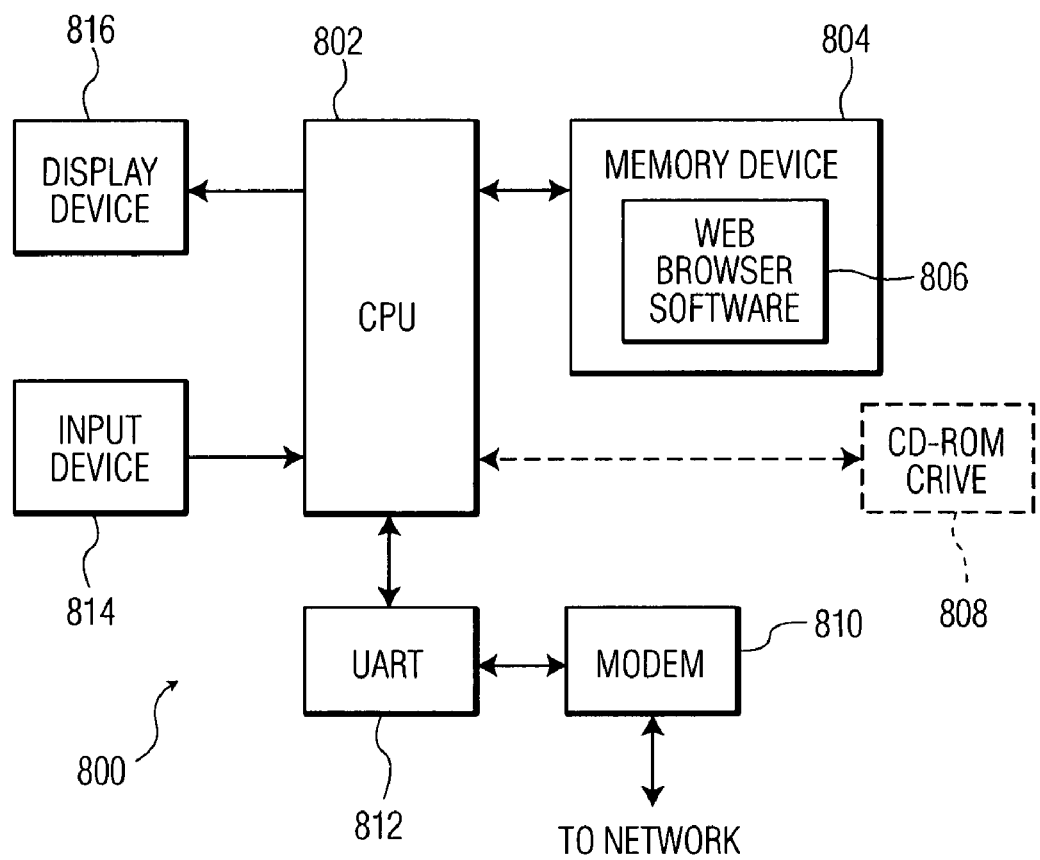
FIG. 8 illustrates a schematic block diagram of a general purpose computer for accessing the pre-recorded on-hold messages in accordance with an embodiment of the present invention.

Window 712 is essentially the same window as seen in FIG. 4, i.e., message playlist table 400. When viewed in playlist library 20, it is also referred to as playlist editor 730. Playlist editor 730 indicates whether or not a playlist has an effective transmission date, the telephone extensions or telephone lines on which the playlist is to be played, as well as the messages in the playlist. Extension numbers can be specified by clicking on the extension numbers box 422 in message playlist table 400(*n*), which will show a window that displays all the extension numbers a for locations associated with on-hold delivery system 100. These extension numbers can then be activated by being selected and dragged to an "activate extension numbers" window, or by double clicking on each individual extension number and dragging it to the "activate extension numbers" window. Alternatively, an "All" button can be clicked to automatically list all telephone extensions highlighted in the area 712. Messages can be selected by clicking them in the message library area 18 or on the message viewer screen (e.g., screen 612). A remove button not shown is provided to remove selected ones or all of the messages in the current playlist 610. The entries in the playlist area 12 can then be saved or canceled by clicking a "Save" button (not shown) or a "delete" button (not shown), respectively. The playback device 1, 200 is programmed to update its memory to reflect changes made through the interaction of the various prompts transmitted and displayed in the form of screens on a remote computer or control device controlled by the operator As stated previously, processors 4, 202 of the playback 1, 200 are programmed to generate prompts to guide the operator in describing relationships between messages, playlists, and telephone extensions and lines. The various prompts provide for a variety of transactions between the message on-hold delivery system 100, playback devices 1, 200 and the operator. FIG. 8 is a schematic block diagram of a general purpose computer for accessing the message-on-hold prerecorded messages in accordance with an embodiment of the present invention.

The message on-hold delivery system 100 realizes a number of advantages over existing message delivery systems. The use of intelligent message storage technology overcomes the aforementioned problems with systems that employ "dumb connections" to a business telephone system 2. The screens generated by the message on-hold delivery system 100, and transmitted to the operator, allows the operator to select messages available at the message on-hold delivery system 100 for playback via a the business telephone system 2 as well as to define multiple playlists, and to associate each playlist with a set of telephone extension numbers or telephone lines connected to the business telephone system 2. Thus, callers calling particular telephone extensions and placed on hold will hear the messages defined in the playlist associated with the called telephone extension. Furthermore, the order in which the messages are to be played can be defined. Thus, managers of private and public organizations can use the messaging on-hold delivery system 100 to program the information they wish to provide their customers via a telephone system or other audio and/or visual advertising device from a location at any time during the day or evening, efficiently and cost-effectively.

The present invention has been described with reference to certain exemplary embodiments thereof. However, it will be readily apparent to those skilled in the art that it is possible to embody the invention in specific forms other than those of the exemplary embodiments described above. This may be done without departing from the spirit and scope of the invention. The exemplary embodiments are merely illustrative and should not be considered restrictive in any way. The scope of the invention is defined by the appended claims and their equivalents, rather than by the preceding description.

What is claimed is:

1. An on-hold messaging system, comprising:
    a business telephone system comprising a plurality of lines or extensions on which a calling party from outside the system may be placed on hold;
    a storage device for storing a plurality of messages;
    a message playback device for playing said messages; and
    a control device for permitting an extension user of said telephone system to select two or more messages from among said plurality of stored messages and one or more lines or extensions from among said plurality of lines or extensions on which said two or more selected messages are to be played by the message playback device when a caller or called party is placed on hold on said telephone system;
    wherein the number of said one or more lines or extensions selected using said control device can be less than the total number of said plurality of lines or extensions.

2. The on-hold messaging system of claim 1, wherein said control device permits said user to select the order in which said one or more selected messages are to be played by said message playback device on said one or more selected lines or extensions.

3. The on-hold messaging system of claim 1, wherein said control device permits said user to select a first message from the plurality of messages to be played by said message playback device on a first line or extension from among said plurality of lines or extensions, and to select a second message from said plurality of messages to be played by said message playback device on a second line or extension from among said plurality of lines or extensions, wherein said first message is different from said second message.

4. The on-hold messaging system of claim 1, wherein said control device is selected from the group consisting of a proprietary telephone instrument, a standard DTMF telephone, a general purpose computer, a cellular telephone, and a hand-held computer device.

5. The on-hold messaging system of claim 1, wherein said message playback device comprises a processing device, and wherein said storage device stores said messages as respective files.

6. The on-hold messaging system of claim 1, wherein each of said messages comprises at least one of an audio message, a video message and a multimedia message selectable to be played to the user.

7. An on-hold messaging system, comprising:
   a business telephone system comprising a plurality of lines or extensions; and
   an on-hold message playback device intelligently connected to or integrated with said telephone system and playing messages selected by and extension user to outside callers into said telephone system that are placed on hold on one of said lines or extensions;
   wherein said on-hold message playback device is programmable by the extension user through a communication device operatively communicating with said telephone system to selectively program at least two messages for playback on a selected one of said lines or extensions.

8. The on-hold messaging system of claim 7, wherein said on-hold message playback device provides prompts to a user of said telephone system, said on-hold message playback device further being operable to receive response signals from said user.

9. The on-hold messaging system of claim 8, wherein at least one of said prompts includes a list of messages which said user can select for playing by said on-hold message playback device.

10. The on-hold messaging system of claim 8, wherein said user response signals correspond to a playlist comprising data relating to said plurality of messages, and wherein said on-hold message playback device is operable in response to said user response signals to implement said playlist.

11. The on-hold messaging system of claim 8, wherein at least one of said prompts comprises a portion of a message playable by said on-hold message playback device.

12. The on-hold messaging system of claim 8, wherein at least one of said prompts includes a list of messages which said user can select for playing by said on-hold message playback device.

13. The on-hold messaging system of claim 12, wherein said current playlist and said pending playlist comprise reference codes corresponding to selected messages.

14. The on-hold messaging system of claim 12, wherein said pending playlist comprises a date and time corresponding to when said pending playlist is to be implemented by said message playback device.

15. The on-hold messaging system of claim 12, wherein said prompts allow said user to specify at least one of a plurality of parameters selected from the group consisting of a time of day when a pending playlist is to be implemented by said on-hold message playback device, a date on which a pending playlist is to be implemented by said on-hold message playback device, a sequence in which selected messages are to be played by said on-hold message playback device, and how many times to repeat selected messages in said sequence of messages played by said on-hold message playback device.

16. The on-hold messaging system of claim 12, wherein said prompts guide said user to carry out an operation selected from the group consisting of selecting a message from a current playlist or a pending playlist, adding a message to a current playlist or a pending playlist, deleting a message from a current playlist or a pending playlist, changing a sequence of messages in a current playlist or a pending playlist, and changing at least one of a date or time for playing a message in a current playlist or a pending playlist.

17. A method of operating a message playback device to play on-hold messages through a business telephone system, comprising the steps of:
   storing a library of discrete and individually accessible messages for playing by said message playback device;
   storing information for uniquely identifying each of said messages in a memory of said message playback device;
   selecting at least two of said messages from said library for playing by said message playback device;
   selecting at least one line or extension of a telephone system on which said message playback device is to play said at least two selected messages, wherein the at least two messages are selected by an extension user and wherein the number of lines or extensions selected can be less than the total number of lines or extensions of the telephone system; and
   playing at least a portion of said at least two selected messages on said message playback device to an outside party placed on hold on said at least one line or extension.

18. The method of claim 17, wherein said stored information comprises at least one of a title and an identification code.

19. The method of claim 17, further comprising the steps of:
   generating and transmitting prompts relating to said stored messages to a control device; and
   using said control device to transmit response signals to said message playback device corresponding to said at least one selected message.

20. The method of claim 19, further comprising the steps of:
   receiving said response signals at said message playback device; and
   accessing said at least one selected message from said library.

21. The method of claim 19, wherein said messages are stored on at least one optical disc.

22. A method of operating a message playback device to play on-hold messages through a business telephone system, comprising the steps of:
   storing a library of discrete and individually accessible messages at a message playback device, each message being uniquely identified by at least one of an identification code and a title;
   generating and transmitting prompts from said message playback device to a control device, said prompts comprising at least one of said identification code and said title for at least one of said messages;
   operating said control device to identify messages from said library for playing by said message playback device and a sequence for playing said messages, and to generate response signals relating to said messages and said sequence;
   entering, by an extension user, playlist data using said control device to respond to said prompts, said prompts providing selections to the extension user selected from the group consisting of said identification codes of selected ones of said messages, said titles of selected ones of said messages, times for commencing the playing of said messages, and a sequence for playing said messages; and causing said message playback device to play at least a portion of a message selected by the extension user to an outside party when the outside party is placed on hold by the telephone system;

wherein said message playback sequence can vary depending upon a line or extension upon which said outside party is placed on hold.

23. The method of claim 22, further comprising the steps of:

receiving said response signals at said message playback device; and accessing said selected messages from said library stored at said message playback device.

24. An on-hold message system, comprising:

a business telephone system;

a storage device for storing a plurality of on-hold messages, each of said messages comprising a beginning; and an on-hold message playback device for playing at least a portion of at least two of said plurality of stored on-hold messages selected by an extension user to an outside party through said telephone system;

wherein, when an outside party is placed on hold after a telephone call is established with said telephone system, said at least two on-hold messages are played to the outside party from their beginning.

25. The on-hold message system of claim 24, further comprising a processor connected to said storage device and programmable to access said plurality of on-hold messages and to cause at least a portion of at least one of said on-hold messages to play to an outside party placed on hold by a user of said telephone system, wherein a user can select a sequence of said on-hold messages, said processor being programmable to access each of said selected on-hold messages in said storage device to provide said on-hold messages to an input of said on-hold message playback device for playing on an output of said on-hold message playback device in accordance with said sequence.

26. An on-hold message system, comprising:

a business telephone system comprising a plurality of lines or extensions; and an on-hold message playback device intelligently connected to or integrated within said telephone system;

wherein said on-hold message playback device plays at least a portion of at least two of a plurality of on-hold messages selected by an extension user to an outside party connected to said telephone system when said outside party is placed on hold, said on-hold message playback device being programmable by the extension user by inputting commands to said on-hold message playback device using a control device located external to the telephone system, said on-hold message playback device further being programmable by said control device to control a playback order of said plurality of on-hold messages and to designate selected messages to be played to a selected subset of the lines or extensions of the telephone system on which the outside party may be placed on hold when said outside party is placed on hold.

27. The on-hold messaging system of claim 26, wherein said control device comprises at least one of a proprietary telephone instrument, a standard DTMF telephone, a general purpose computer, a cellular telephone and a hand-held computer device.

28. The on-hold messaging system of claim 26, wherein said control device communicates with said on-hold message playback device using a network.

29. The on-hold messaging system of claim 28, wherein said network comprises at least one of a local area network (LAN), a wide area network (WAN), the Internet, a private telephone network, a cellular telephone network, a satellite network and a public switched telephone network (PSTN).

30. The on-hold messaging system of claim 26, further comprising a memory device for storing said plurality of on-hold messages.

31. The on-hold messaging system of claim 30, wherein said memory device is integrated within said on-hold message playback device.

32. The on-hold messaging system of claim 26, wherein said message playback device comprises a processor for generating at least one prompt provided to the control device for programming said message playback device.

33. The on-hold messaging system of claim 32, wherein said at least one prompt comprises at least one of a message library, a playlist library, a list of telephone lines, a list of voice terminal extensions and a list of voice IP terminals.

34. The on-hold messaging system of claim 26, wherein said on-hold message playback device is integrated within said telephone system as an independent and removable hardware component.

35. The on-hold messaging system of claim 34, wherein said on-hold message playback device comprises a computer card integrated with said telephone system.

36. The on-hold message system of claim 7, wherein said communication device is a telephone.

37. The on-hold message system of claim 7, wherein said communication device is a general purpose computer.

* * * * *

UNITED STATES PATENT AND TRADEMARK OFFICE
CERTIFICATE OF CORRECTION

| | | |
|---|---|---|
| PATENT NO. | : 8,259,912 B2 | Page 1 of 1 |
| APPLICATION NO. | : 11/783188 | |
| DATED | : September 4, 2012 | |
| INVENTOR(S) | : Joey C. Hazenfield | |

It is certified that error appears in the above-identified patent and that said Letters Patent is hereby corrected as shown below:

Column 3, Lines approx. 20-21 reads "… message maybe displayed to …" and should read
--… messages may be displayed to …--

Column 6, Lines approx. 7-8 reads "… one or more of remotes devices 60." and should read --… one or more of remote devices 60.--

Column 7, Line approx. 40 reads "… table 400 is comprises …" and should read
--… table 400 comprises …--

Column 7, Line approx. 50 reads "… on-hold system 100)." and should read
--… on-hold system 100.--

Column 8, Lines approx. 16-17 reads "… devices 1, 200 is are programmed to …" and should read
--… devices 1, 200 are programmed to …--

Column 8, Lines approx. 27-28 reads "… display of prompts on a are depicted on …" and should read
--… display of prompts are depicted on …--

Column 9, Line approx. 42 reads "… numbers a for locations …" and should read --… numbers for locations …--

Column 10, Lines approx. 9-10 reads "… screens generated by … allows the …" and should read
--… screens generated by … allow the …--

Column 11, Line 19, Claim 7 reads "… messages selected by and extension user…" and should read
--… messages selected by an extension user …--

Signed and Sealed this
Eighth Day of January, 2013

David J. Kappos
*Director of the United States Patent and Trademark Office*